(12) United States Patent
Karapetyan

(10) Patent No.: US 8,528,251 B1
(45) Date of Patent: Sep. 10, 2013

(54) DEVICE FOR OXYGEN ENRICHMENT OF A SOIL

(76) Inventor: Armen Karapetyan, Los Angeles, CA (US)

( * ) Notice: Subject to any disclaimer, the term of this patent is extended or adjusted under 35 U.S.C. 154(b) by 0 days.

(21) Appl. No.: 13/507,530

(22) Filed: Jul. 6, 2012

(51) Int. Cl.
*A01G 7/00* (2006.01)
(52) U.S. Cl.
CPC .................................... *A01G 7/00* (2013.01)
USPC ..................... 47/66.6; 47/57.5; 405/128.7
(58) Field of Classification Search
USPC .................................................. 47/57.5, 66.6
See application file for complete search history.

(56) References Cited

U.S. PATENT DOCUMENTS

| | | | |
|---|---|---|---|
| 5,073,240 A | 12/1991 | Raggio et al. | |
| 5,120,158 A | 6/1992 | Husu | |
| 5,201,860 A * | 4/1993 | Richardson | 47/39 |
| 5,433,759 A | 7/1995 | Benson | |
| 5,542,208 A | 8/1996 | Benson | |
| 6,018,909 A | 2/2000 | Potts | |
| 6,612,069 B2 * | 9/2003 | Locke et al. | 47/1.01 R |
| 2002/0088177 A1 * | 7/2002 | Gergek | 47/79 |
| 2009/0205251 A1 * | 8/2009 | Irmler | 47/79 |
| 2011/0219684 A1 * | 9/2011 | Ciudaj | 47/48.5 |

* cited by examiner

*Primary Examiner* — Thomas B Will
*Assistant Examiner* — Katherine Chu

(57) ABSTRACT

The present device for oxygen enrichment of a soil generally comprises the perforated vertical tubular means pivotable in the vertical portion of the tubular connecting means, thereby providing by the soil loosening means a loosening of the sub-surface soil at the plant's rootzone. Also, the improved device includes the perforated horizontal tubular means, coupled with the vertical tubular means via tubular connecting means, which comprises the slots for unobstructed movements along the appropriate slots of the extended ends of the lower soil loosening means, and the handle means rigidly connected to the upper end of the vertical tubular means and intended for rotation of the vertical tubular means in the vertical portion of the tubular connecting means.

9 Claims, 7 Drawing Sheets

DEVICE FOR OXYGEN ENRICHMENT OF A SOIL

FIELD OF THE INVENTION

The invention relates to the devices for oxygen enrichment and/or atmospheric air enhancement in a soil, and specifically, invention relates to the devices and apparatus for oxygen/air enrichment/enhancement in the agricultural and/or garden soil, and more specifically for oxygen and/or atmospheric air enrichment/enhancement in the agricultural or garden soil in the area of the plant's roots.

BACKGROUND OF THE INVENTION

There are known many methods and devices for oxygen enrichment of the soil. These methods and devices provide increasing of the amount of the atmospheric air or pure oxygen in the sub-surface soil.

The atmospheric air in the soil profile removes accumulated unwanted gases, and provides more oxygen than otherwise would tend to be present.

It is known that the air in the soil profile will change moisture content and temperature. It is understood that it is important to additionally control gas constituents in the subsoil, such as the amounts of oxygen, carbon dioxide, methane and hydrogen sulfide. It is found that when the atmospheric air/oxygen is presented at the rootzone in the soil, there is enhanced root system development, better growth, better resistance to disease, etc.

It is also known that here is much commercial interest in promoting good vegetation growth. It is very important to obtain optimal growing conditions in the root are. It is known and well recognized that plant's life depends upon the character of the soil surrounding the roots. It has become increasingly recognized that it is advantageous to provide a soil with appropriate aeration.

Provision of air has been sought by various means. In one simple widely used procedure, small (one-half inch diameter) holes are created in the surface of the field, by drilling or punching with a machine.

While simple, this process is relatively inefficient since air enhancement takes place until the natural closing of the drilled holes under the natural atmospheric forces, etc.

This is typically accomplished by a mechanical system involving air moving machinery connected to an array of sub-surface pipes installed as an adjunct to a permeable layer of the soil profile.

For instance, U.S. Pat. No. 5,433,759 to Benson describes a ventilating system wherein an air pressure is applied to the piping system, to thereby affect the conditions in the layered soil and turf. However, results obtained will vary according to the morphology (structure) of the soil. In practice, air has been periodically injected in the sub-surface piping system according to the subjective judgment of the user of the system.

Since there has been no particular efficient mechanism or systematic way for air/oxygen enrichment of the soil in the root areas, such tendency heretofore has not found wide application in the agriculture and/or gardening. Another drawback is a significantly expensive induction mechanical system(s) of the enforceable enrichment of the soil.

The similar principle has been used in the U.S. Pat. No. 6,018,909, where is the air injecting apparatus creates the pressure differential in the soil. The numerous pipes are installed horizontally underground beneath the vegetation's roots surface through the soil.

Additionally to the noticed drawback hereinabove regarding significantly expensive equipment, the pressure method(s) provide an oxygen in excess to atmosphere by connecting an oxygen source to the air pressure supply, but as it is known, any excess oxygen does not necessarily speeds the process.

Another U.S. Pat. No. 5,037,240, provides the wick drains used alone or in combination with the porous or slotted pipes depending on the type of treatment to be applied to the particular area and particular soil conditions. The tubing or pipes is used in soil to enhance the air for desired sub-surface condition.

The drains may be used to deliver the oxygen. The wick drains are installed at a close spacing configuration. The existing track excavators are used to install the wick drains. The method also employs the tubes and pipes of porous configuration to inject or pump an oxygen. This method has the same deficiencies, as the methods and apparatus/devices described hereinabove.

The multi-pipes traces are also used in the U.S. Pat. Nos. 5,120,158 and 5,542,208.

Regarding U.S. Pat. No. 5,120,158, a pipe arrangement includes a surface layer and a filter layer beneath the surface layer. In the filter layer, there is situated an arrangement of pipes, divided into several sections. In each section, there are numerous pipes to circulate warm air into it. These pipes are connected at intervals by their ends to a distribution pipe and these in their turn at intervals by their ends to a main pipe, which is finally connected to blowing machinery by means of a feed pipe. The main pipes are located on the long side of the field and they are connected at regular intervals to distribution pipes, which extend from the side of the field from main pipe to essentially the center of the field. All the distribution pipes of the same main pipe are connected to multi-purpose pipes, which run in the same direction as the main pipe.

The soil area (field) is divided into four separate pipe network sectors. A blower apparatus, in which there are also heating cells to warm the air to be blown, is located at the side of the field. A feed pipe is communicated from blower to the main pipe of the pipe network sections. Main pipes have valves on each by means of which it is possible to blow air or cut off the air blowing to each section separately.

According to the description of the U.S. Pat. No. 5,542,208, the mobile unit comprises a blower connected into a duct network beneath a use site/field to induce a flow of air upwardly through the soil and subsoil of the use site. The blower is equipped with a four-way reversing valve so that the flow of air moving through the duct network can be reversed to pull air downwardly through the soil profile during certain climatic periods. The four-way flow reversing valve contains four control valves mounted in a bridge configuration. The discharge side of the blower is connected to the unit by line. One pair of the bridge legs is connected to the supply line while the opposite pair of legs is attached to an air line that communicates with the surrounding ambient. The exit to the bridge between legs is connected to the inlet side of blower by means of return line. When one pair of valves is closed and the other pair of valves is opened, ambient air is delivered to the inlet side of the blower and is pumped into the duct network. The air is passed through the lines of the duct network and uniformly distributed. The blower delivers low pressure air at a high enough volume such that the air is pushed upwardly through the soil and subsoil into the surrounding ambient. Air moving upwardly through the green is used to aerate the soil.

The apparatus/unit by these two patents include the expensive equipment, and the pressure ("blowing") method(s) can provide an oxygen in excess to atmosphere by connecting an oxygen source to the air blowing machinery.

Thus, the known devices are expensive, and in order to provide the soil oxygen enrichment include an expensive mechanical blowing/pumping means coupled to the underground traced expensive pipes' system.

The mentioned hereinabove methods and devices do not loosen the soil for natural enhance of oxygen in the sub-surface area near the plant's root at the rootzone.

Therefore, the mentioned known methods and devices have the described above deficiencies which are eliminated in the improved device for oxygen enrichment of a soil.

Considering that most plants always require the enhancement of the oxygen concentration in the soil's rootzone, the atmospheric air, delivered by the improved device, into the loosened (by the improved device) sub-surface soil area at the rootzone will provide the faster growth of the plants/vegetations.

Also, it is more effective to delivery the atmospheric air into the loosened soil.

Additionally, the improved device provides the better condition (e.g., the loosened soil) of the sub-surface soil for the plant's root development.

While the mentioned above prior art fulfill their respective, particular objectives and requirements, the mentioned prior art inventions do not disclose, teach and/or suggest the device for oxygen enrichment of a soil including the means for loosening of the sub-surface soil at the rootzone of the vegetations.

Those skilled in the art will readily observe that numerous modifications and advantages of the improved device for oxygen enrichment of a soil may be made while retaining the teachings of the invention.

Thus, the known prior art do not provide the efficient, not expensive, and convenient device for oxygen enrichment of a soil according to the present invention substantially departs from the devices of the prior art.

OBJECT AND ADVANTAGES OF THE INVENTION

Accordingly, several objects and advantages of the present invention are to provide the improved device for oxygen enrichment of a soil:

It is object of the invention to provide an improved device which provides the enhancement of the oxygen in the soil for the vegetation root's growth development.

It is another object of the invention to provide an improved device which loosens the soil for the vegetation root's growth development.

It is another object of the invention to provide an improved device which loosens the soil for the oxygen and/or atmospheric air delivery into the soil.

It is further another object of the invention to provide an improved device with the increased efficiency of the vegetation's growth.

Still, further objects and advantages will become apparent from a consideration of the ensuing description accompanying drawings.

DESCRIPTION OF THE DRAWING

In order that the invention and the manner in which it is to be performed can be more clearly understood, embodiments thereof will be described by way of example with reference to the attached drawings, of which.

It is understood, that these illustrations and drawings are the examples of the improved device configurations and architectures, and those skilled in the art will readily observe that numerous structures, modifications and advantages of the improved device for oxygen enrichment of a soil may be made while retaining the teachings of the present invention.

SUMMARY OF THE INVENTION

In view of the foregoing disadvantages inherent in the known prior art, the present invention provides an improved device for oxygen enrichment of a soil. As such, the general purpose of the present invention, which will be described hereinafter in greater details, is to provide the improved device providing a loosening of the sub-surface soil and delivery of the atmospheric air into the pores of the loosened air.

The improved device has many of the advantages of the oxygen enhancement in the sub-surface soil at the rootzone and many novel features that result in the efficient growth of the plants and vegetations, which is not anticipated, rendered obvious, suggested or even implied by any of prior art methods and devices for soil enrichment, either alone or in any combination thereof.

This invention, device for oxygen enrichment of a soil, provides the enhancement of the oxygen in the area of the root(s) in the sub-surface soil layer.

To attain this, the present invention generally comprises the perforated vertical tubular means pivotable in the vertical portion of the tubular connecting means, thereby providing by the soil loosening means a loosening of the sub-surface soil at the plant's rootzone. Also, the improved device includes the perforated horizontal tubular means, coupled with the vertical tubular means via tubular connecting means, which comprises the slots for unobstructed movements along the appropriate slots of the extended ends of the lower soil loosening means, and the handle means rigidly connected to the upper end of the vertical tubular means and intended for rotation of the vertical tubular means in the vertical portion of the tubular connecting means.

DESCRIPTION OF THE PREFERRED EMBODIMENTS

With reference now to the drawings, and particularly to FIGS. 1-6a, 6b-12a, 12b-14 thereof, an improved device for oxygen enrichment of a soil embodying the principles and concepts of the present invention.

The term "tubular" hereinbelow solely and/or jointly accumulate the meaning, for instance, of the "tube", "pipe", etc. Therefore, the use at least one of the terms does not exclude the other meanings for the used term, if otherwise not specified.

Figure 1:
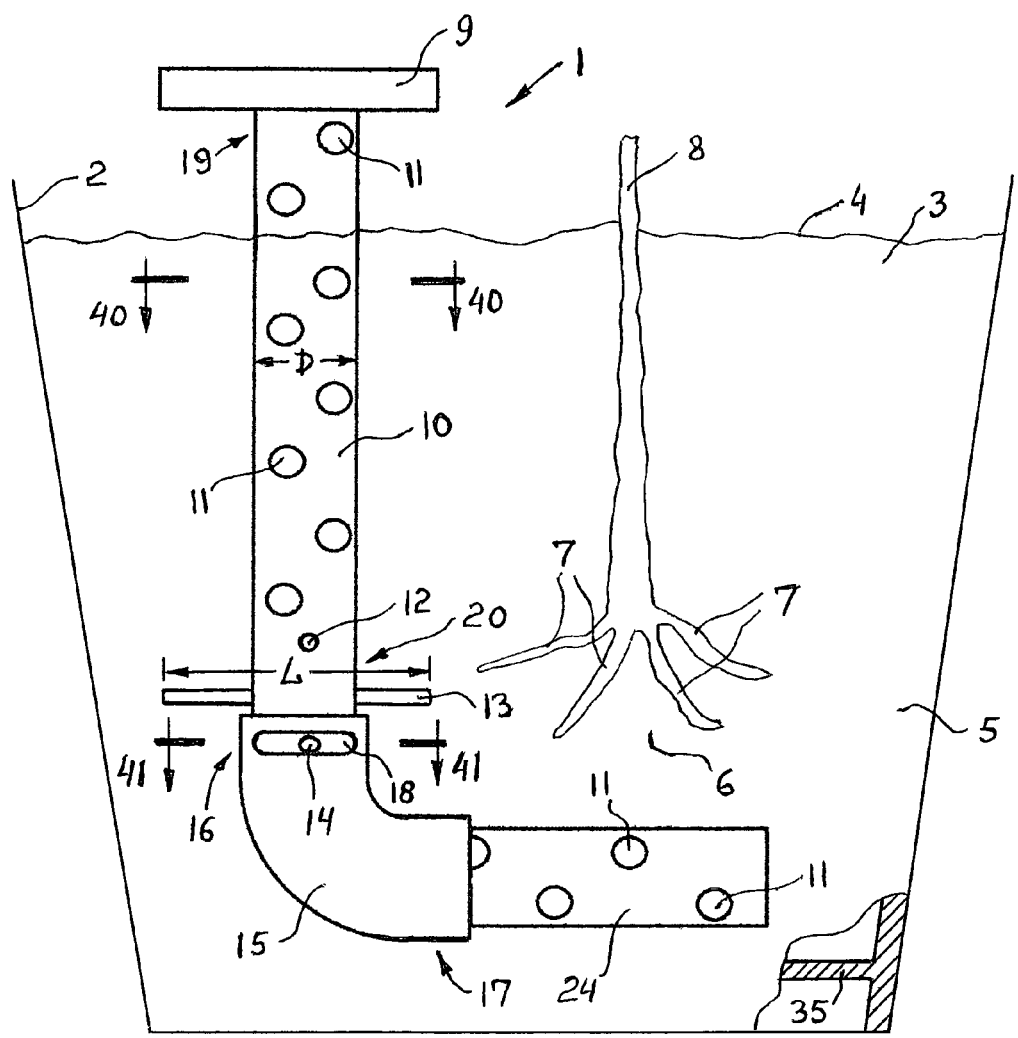
FIG. 1 is a simplified illustration of the improved device for oxygen enrichment of a soil.

In the FIG. 1 are shown the improved device 1 inserted in the garden pot 2. Also, in the FIG. 1 are shown the soil 3 comprising the soil surface 4 and the sub-surface soil 5 including the rootzone 6, in which the root(s) 7 of the plant 8 are located.

The improved device 1 includes the handle means 9 and the vertical tubular means 10 comprising the apertures (perforation) 11, the first soil loosening means 12, the second soil loosening means 13 and the third soil loosening means 14. The improved device 1 also comprises the tubular connecting means 15, which includes the vertical portion 16 and horizontal portion 17, and two slots: the first slot 18 and second slot 27 (see, also, for example, FIGS. 6a, 6b), and the horizontal tubular means 24 comprising the apertures 11.

The handle means 9 is coupled with the upper end 19 of the vertical tubular means 10. The handle means 9 can include the apertures/perforation too (not shown, e.g., apertures 11 or alike and/or other types of openings, for instance, for the chemicals and/or soil nutrition supplementals delivery to the sub-surface soil in the rootzone). The rigid coupling of the handle means 9 with the upper end 19 of the vertical tubular means 10 can be provided by gluing to each other or by any other reasonable methods of their rigid connection to each other.

The first soil loosening means 12, the second soil loosening means 13 and the third soil loosening means 14 are located in the area of the lower end 20 of the vertical tubular means 10. The first 12 and third 14 soil loosening means are locate in the same plane (not shown), and are perpendicular to the second soil loosening means 13. The configuration of the first soil loosening means 12, the second soil loosening means 13 and the third soil loosening means 14 is conditionally shown in FIGS. 1-4, 6a, 8-10, 12a, 12b as the pins passing through the vertical tubular means 10 perpendicularly to the axis 50 (see FIG. 4) of the vertical tubular means 10 in such manner that their ends extend over outside surface 21 of the vertical tubular means 10 (the length "L" of the soil loosening means is bigger than the outside diameter "D" of the vertical tubular means 10, i.e., L>D [see FIG. 1]). The length of the extension of the ends of the tubular means 10 is not limited, but reasonably can be in the approximate range of 0.25 inch-2.0 inches for the purpose to loosen a soil, for example, in the typical garden pot. In FIGS. 1-4, 6a, 8, 10, 12a, 12b, 14 the diameter of the soil loosening means is shown approximately the same, but the diameter of each of them can be different. The reasonable diameter of the soil loosening means can be in approximate range of 1/16 inch-1/4 inch. Also, the soil loosening means 12-14 are conditionally shown in FIGS. 1-4, 6a, 6b, 8-10, 12a, 12b, 14 of the cylindrical configuration, but they can be of any reasonable configuration and form, for instance, of square or triangular forms, etc. (not shown) or of any reasonable irregular form/shape (not shown). The FIG. 12b illustrates a variant where the soil loosening means 12 have only one end extended from the vertical tubular means 10. If such configuration will have the soil loosening means 14, than the vertical portion 16 of the tubular connecting means 15 (FIGS. 1-3) or of the connection means 30 (FIG. 4) will comprise only one slot (e.g., the slot 18).

Figure 14:
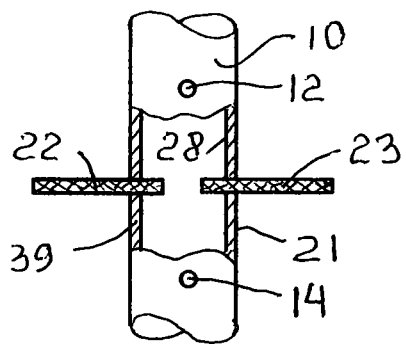
FIG. 14 is a simplified drawing of the coupling variant of the vertical tubular means with the soil loosening means.

In FIG. 14 the second soil loosening means 13 is conditionally shown of two short pieces: first half 22 portion of the second soil loosening means and second half 23 portion of the second soil loosening means 13, but each soil loosening means can be presented by two halves (not shown). The soil loosening means of solid (not divided for two halves), as well as the soil loosening means of two halves configuration are rigidly coupled with the vertical tubular means 10 (e.g., tightly screwed into the wall of the vertical tubular means 10, glued or by any reasonable principles of the other rigid connections [not shown]).

Figure 2:
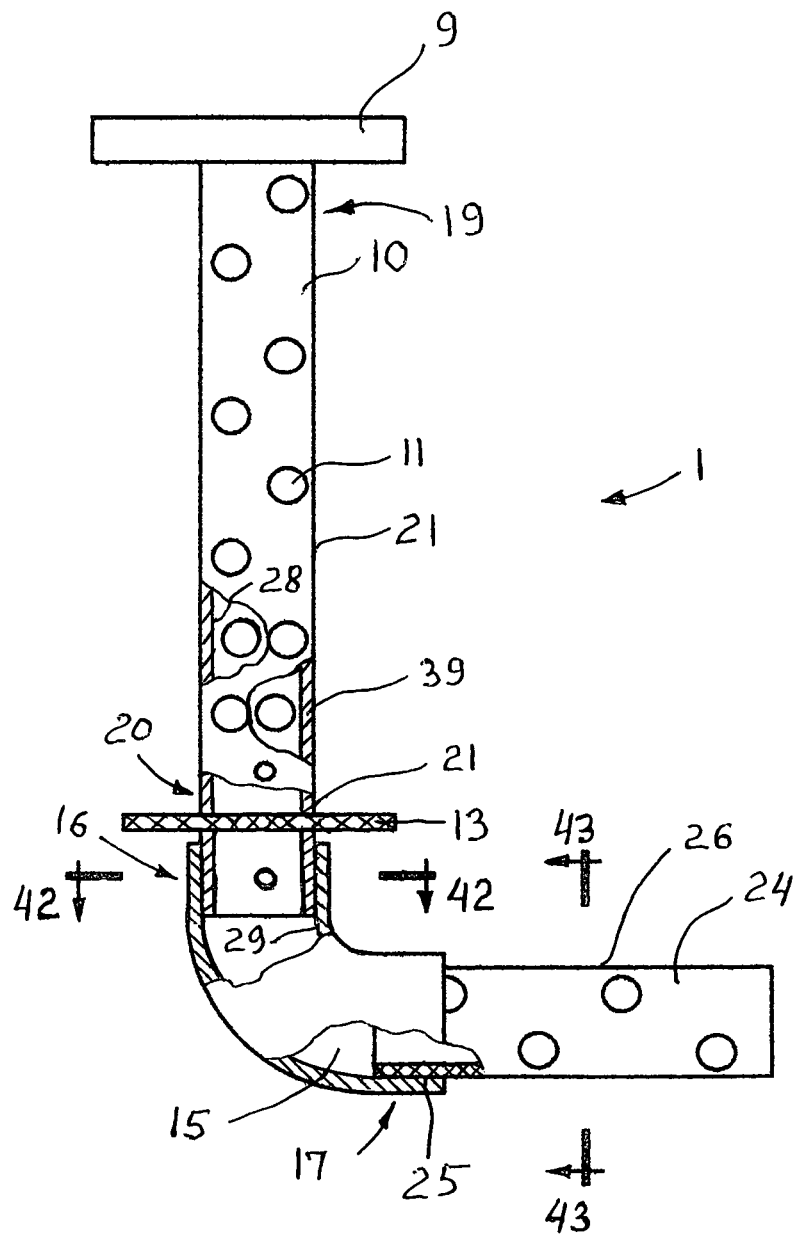
FIG. 2 is a simplified drawing of the first variant of the improved device for oxygen enrichment of a soil.

As it is shown in FIG. 2, the horizontal tubular means 24 is inserted into the horizontal portion 17 of the tubular connecting means 15. The of inner surface 25 of the horizontal portion 17 of the tubular connecting means 15 should have enough tight contact with the outer surface 26 of the horizontal tubular means 24, or the inserted the horizontal tubular means 24 can have a rigid connection with the horizontal portion 17 of the tubular connecting means 15 (e.g., screwed, bolted, glued, welded, etc. depending on the materials of the horizontal tubular means 24 and tubular connecting means 15).

Figure 6A:
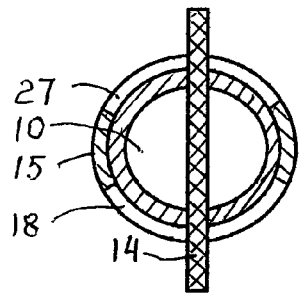
FIG. 6a is a simplified drawing of the cross-section 41-41 of coupling of the lower end of the vertical tubular means with the first variant of the soil loosening means.

As it is understood from FIG. 6a, the ends of the third soil loosening means 14 are extended of the vertical tubular means 10. The one extended side of the third soil loosening means 14 freely passes through the first slot 18 and the other extended side of the third soil loosening means 14 freely passes through the second slot 27. The lower end 20 of the vertical tubular means 10 is not tightly inserted into the vertical portion 16 of the tubular connecting means 15. It means that the outside surface 21 of the vertical tubular means 10 does not have a tight friction with the inner surface 29 of the vertical portion 16 of the tubular connecting means 15, thereby providing free (unobstructed) pivoting movements of the lower end 20 of the vertical tubular means 10 inside the vertical portion 16 of the tubular connecting means 15. The rotation of the vertical tubular means 10 inside the vertical portion 16 of the tubular connecting means 15 is limited by the lengths of the first 18 and second 27 slots, wherein the extended ends of the third soil loosening means 14 make movements along the slots when the vertical tubular means 10 makes the clockwise and counterclockwise rotations inside the static position of the connected tubular connecting means 15 and horizontal tubular means 24. The clockwise and counterclockwise rotations of the vertical tubular means 10 can be provided by an operator (e.g., by gardener, etc.) by pivoting of the handle means 9. During the clockwise and counterclockwise pivoting movements of the vertical tubular means 10, the soil loosening means 12-14 loosen the sub-surface soil 5 at the rootzone area. The atmospheric air, containing the oxygen, passes through the apertures 11 into the loosened sub-surface soil 5, providing enhancement of air (oxygen) into the loosened sub-surface soil 5, thereby enriching the oxygen concentration in the area of the location of the plant's/vegetation's root(s).

It is understandable, that as depth of the sub-surface soil layer increases, the oxygen content of the soil is severely reduced. Aerating the soil with the improved device will enrich the soil with the oxygen during aerobic treatment. If it will be determined that an aerobic degradation of the soil is needed, the soil loosening, and as a result—the additional aeration, can be discontinued and as the available oxygen is utilized, anaerobic conditions will naturally recur.

Figure 5:
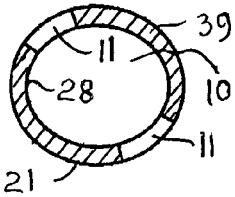
FIG. 5 is a first simplified drawing of the cross-section 40-40 of the vertical tubular means.
Figure 11:
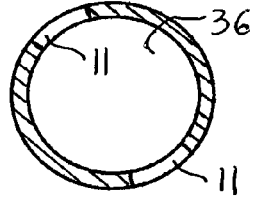
FIG. 11 is a second simplified drawing of the cross-section 47-47 of the horizontal tubular means.

The FIGS. 5, 6a, 6b, 7, 8, 9, 10, 11 illustrate the cross-sections of the appropriate tubular means. For example, the FIGS. 5 and 11 illustrate the locations of the apertures 11 in the vertical tubular means 10 and the horizontal tubular means 24 respectively, additionally to the depiction of the locations of the apertures 11 in the FIG. 2. For more details, the cross-sections are shown in a slightly increased scale.

Figure 3:
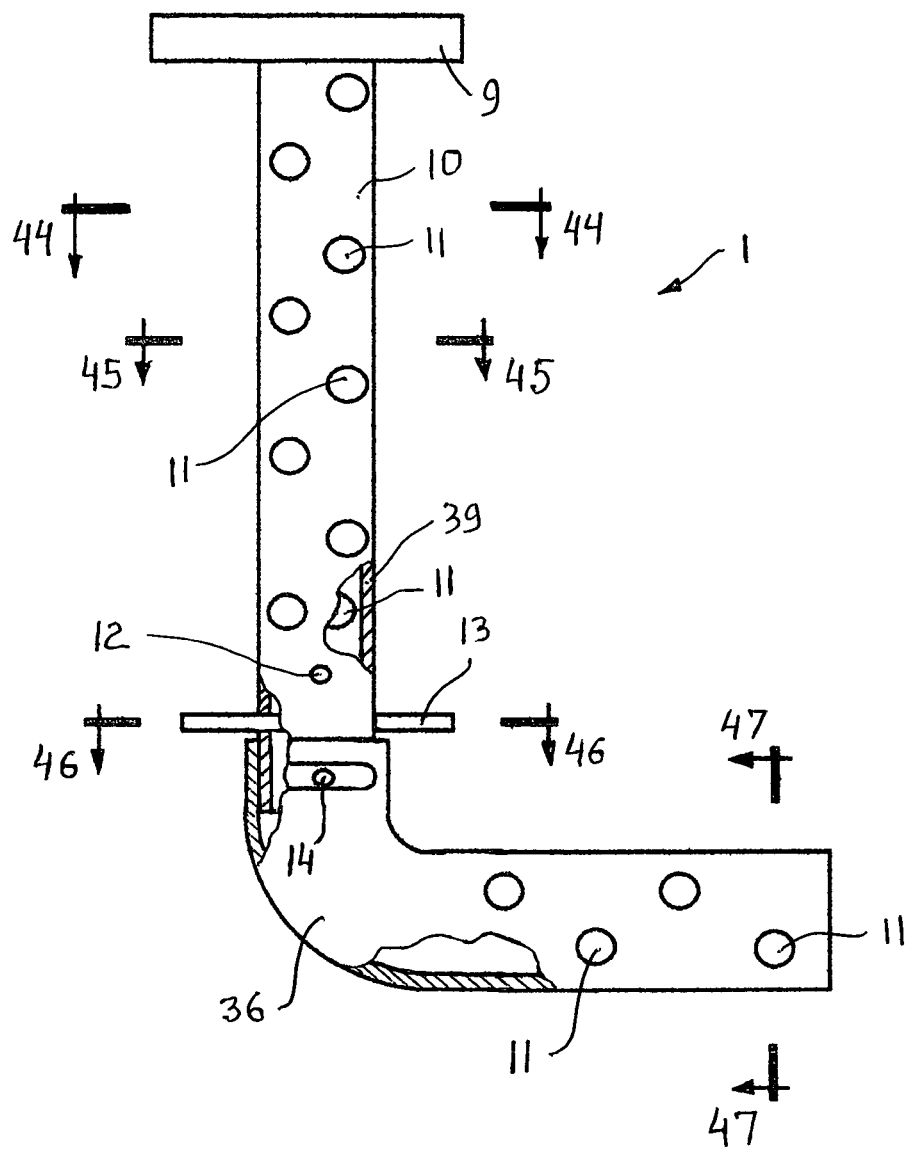
FIG. 3 is a simplified drawing of the second variant of the improved device for oxygen enrichment of a soil.

Referring FIG. 3, the improved device comprises a combination of the horizontal tubular means 24 and tubular connecting means 15 as a whole solid (entire) piece of auxiliary tubular means 36.

Figure 4:
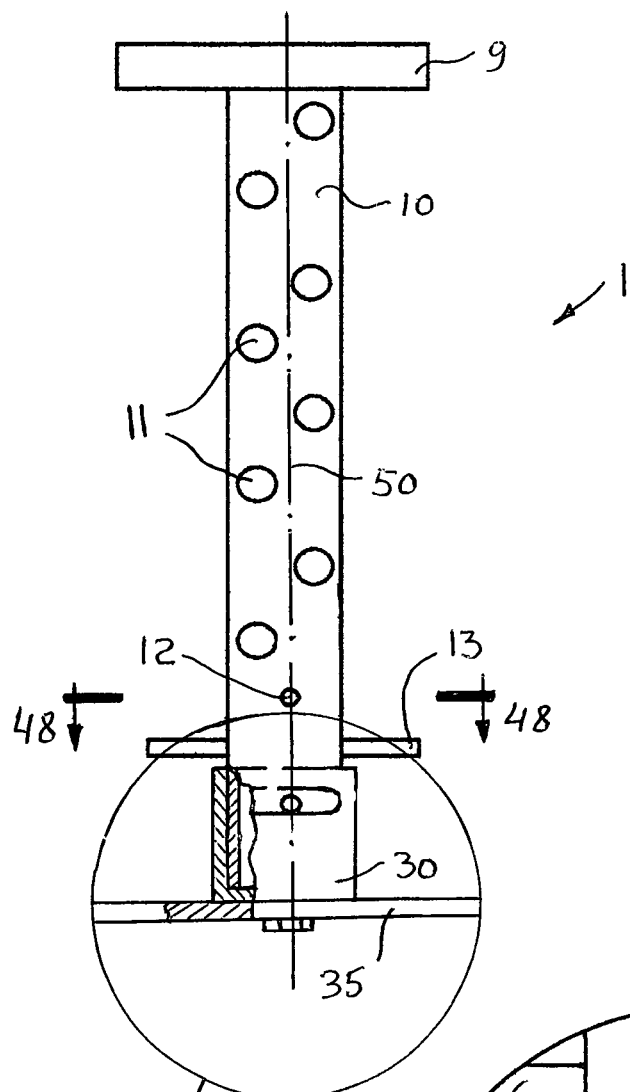
FIG. 4 is a simplified drawing of the third variant of the improved device for oxygen enrichment of a soil.
Figure 13:
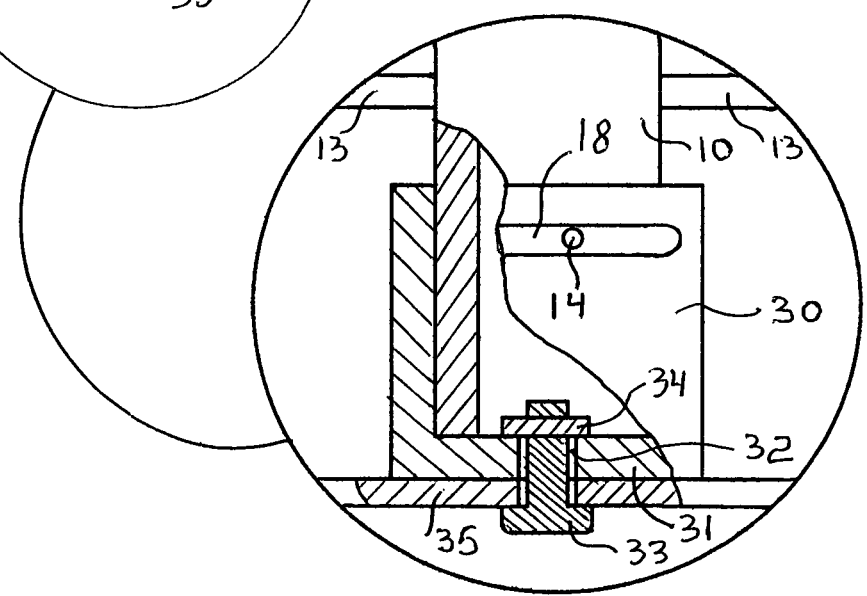
FIG. 13 is a simplified drawing of coupling of the connection means with the garden pot.
Figure 12A:
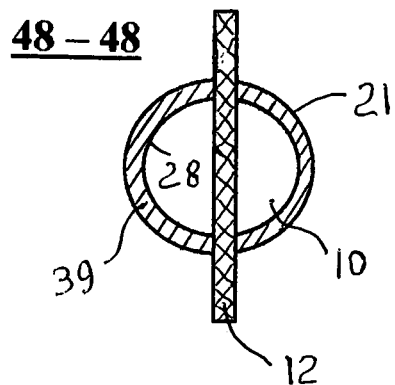
FIG. 12a is a fourth simplified drawing of the cross-section 48-48 of the vertical tubular means.
Figure 12B:
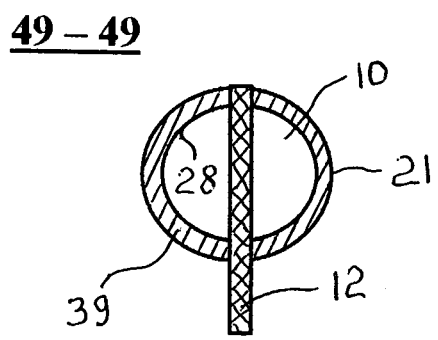
FIG. 12b is a fifth simplified drawing of the cross-section 49-49 of the vertical tubular means.
Figure 15:
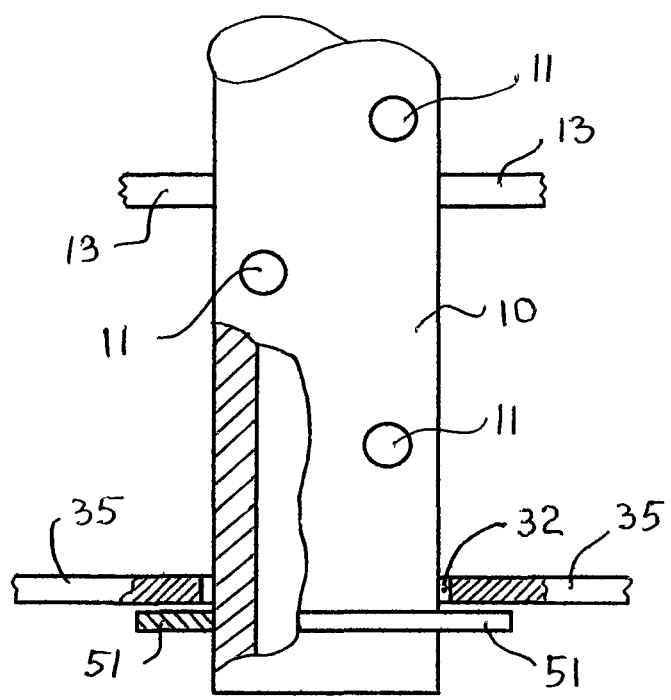
FIG. 15 is a simplified drawing of coupling of the vertical tubular means with the garden pot.

According to FIGS. 12a, 12b and 13, the improved device can be presented without the horizontal tubular means 24, i.e., the improved device 1 (FIGS. 12a, 12b, 13) inserted in the garden pot 2 comprises: the handle means 9, vertical tubular means 10 comprising the apertures (perforation) 11, the first soil loosening means 12, the second soil loosening means 13 and the third soil loosening means 14, the tubular connecting means 15, which includes the vertical portion 16 and horizontal portion 17, the first slot 18 and second slot 27, the horizontal tubular means 24, the upper end 19 of the vertical tubular means 10, the lower end 20 of the vertical tubular means 10, and their appropriate sub-components and elements described hereinabove. As it is shown in FIGS. 4, 13, the connection means 30 has a different configuration than the tubular connecting means 15. Instead of the corner form of the tubular connecting means 15, shown in FIGS. 1-3, 8, and which is not coupled with the garden pot 2, the connection means 30, shown in FIGS. 4, 13, includes the bottom wall 31 comprising the auxiliary aperture 32 intended for the bolt 33 tightening by the nut 34 the bottom wall 31 of the connection means 30 with the bottom wall 35 of the garden pot 2. Instead of nut 34 the thread (not shown) in the auxiliary aperture 32 of the bottom wall 31 of the connection means 30 can be used for tightening (for a rigid connection) by the bolt 33 (or by a screw [not shown]) of the connection means 30 with the bottom wall 35 of the garden pot 2. It is understood, that any other reasonable threaded or not treaded coupling or rigid connections (not shown) can be used too. Also, the coupling (connection) of the vertical tubular means 10 with the garden pot 2 may be provided without tubular connecting means 15 or connection means 30, if the pivotability of the vertical tubular means 10 will be still provided (for instance, the lower end 20 of the vertical tubular means 10 can be unobstructedly pivotable in the bigger auxiliary aperture 32 of the garden pot 2, and can be fixed by washer 51 in order not to be pulled off the pot 2, as it is shown in FIG. 15, etc.).

Figure 6B:
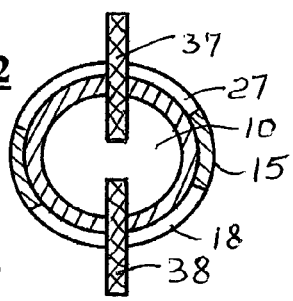
FIG. 6b is a simplified drawing of the cross-section 42-42 of coupling of the lower end of the vertical tubular means with the second variant of the soil loosening means.
Figure 7:
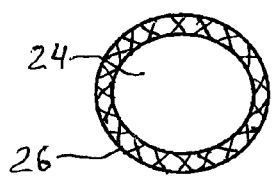
FIG. 7 is a first simplified drawing of the cross-section 43-43 of the horizontal tubular means.
Figure 8:
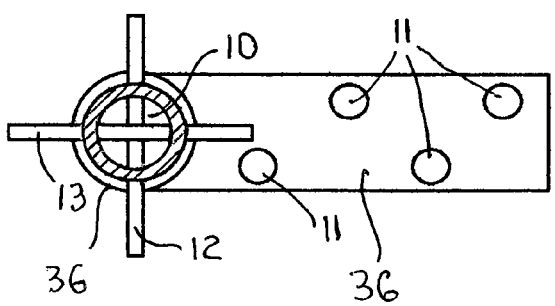
FIG. 8 is a simplified drawing of the top cross-sectional view 44-44 of the improved device.
Figure 9:
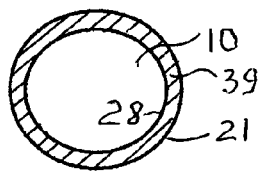
FIG. 9 is a second simplified drawing of the cross-section 45-45 of the vertical tubular means.
Figure 10:
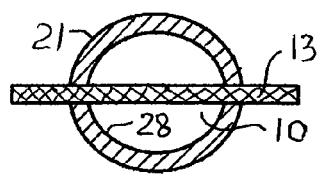
FIG. 10 is a third simplified drawing of the cross-section 46-46 of the vertical tubular means.

It is understandable, that the apertures (perforation) 11 in the figures are conditionally shown of a circular configuration, but the square form apertures or triangular, rectangular, etc. forms of the apertures 11 can be used, as well as any reasonable irregular configuration and forms. Also it should be understood, that there can be any reasonable quantity of the apertures 11, and generalizing any and all possible modifications can be stated that the improved device includes at least one of a plurality of apertures. Additionally, the FIG. 6a depicts two slots 18 and 27 for the uninterrupted (not divided, entire) third soil loosening means 14, and FIG. 6b depicts two slots 18 and 27 for the interrupted (divided) third soil loosening means 14 for two halves (for two pieces): the first half (piece) 37 of the third soil loosening means 14 and second half (piece) 38 of the third soil loosening means 14, but the improved device can comprise, for example, three pieces (not shown) of the short soil loosening means installed (e.g., rigidly screwed, etc.) into the tubular wall 39 of the vertical tubular means 10 under the angle of 120° to each other (not shown). Under these circumstances, the vertical portion 16 of the tubular connecting means 15 or the connection means 30 will comprise the three slots (not shown) appropriately located under the same 120° to each other. Also, it is conditionally shown in FIGS. 1-4 three soil loosening means 12-14, but it can be reasonably less or more of them and under different reasonable distance from each other. Generalizing possible modifications, the improved device can comprise at least one of a plurality of soil loosening means and respectively at least one of a plurality of slots.

The handle means 9 can be of any regular geometric configuration (e.g., cylindrical, elliptical, square, triangle, etc. not shown]) or any reasonable irregular configuration and form (not shown).

The inner configuration of the horizontal portion 17 and respectively the outer configuration of the horizontal tubular means 24 can be of any reasonable regular geometrical form (e.g., square, triangular, rectangular, etc. [not shown]) or any reasonable irregular form/shape (not shown).

The some appropriate means in the device set (e.g., the tubular connecting means 15 and connection means 30) can be interchangeable.

As shown in FIGS. 1-4, the vertical tubular means 10, and as shown in FIGS. 1-3, the horizontal tubular means 24 are perforated throughout their length and can have variable perforations such that the diffused air added to the sub-surface soil. The diameter of the inner surface 28 of vertical tubular means 10 can be of reasonable size to provide durability of the thickness of the wall 39. These tubular means can also consist of uniform porosity flexible rubber (not shown). A determination of which configuration and material of the tubular means 10, 15 and 24 best meets the needs is based on the actual reasonability. The sizes of means of the improved device are varied or modified for different pot's sizes. The goal of the improved device is to create such loosen (by the soil loosening means) soil that the atmospheric air (oxygen), delivered to the sub-surface soil via perforated tubular means of the improved device, is allowed to enter all of the soil pores at a rate that is sufficient for aerobic treatment of the growing plants/vegetations.

The improved device can be installed to any desired reasonable depth or angle in the garden pot. The improved device provides a means of introducing atmospheric air (oxygen) into the sub-surface soil profile at the desired depth. The change of the soil profile from an anaerobic environment to an aerobic environment permits the treatment of sub-surface soils to any desired depth and does not require that any soil be removed from the garden pot for outside treatment.

Thus, significant cost savings from elimination of the expensive equipment and materials are readily obtained. The improved device can also provide the delivery to the sub-surface soil (via perforated tubular means of the improved device or opening [not shown]) the needed biochemicals and soil nutrition supplementals.

The improved device realizing delivery of the atmospheric air/oxygen into pores of the loosened sub-surface soil at the rootzone is significantly needed to provide more efficient enhancement of oxygen for the plant's/vegetation's roots.

CONCLUSION, RAMIFICATION AND SCOPE

Accordingly the reader will see that, according to the invention, an improved device for oxygen enrichment of a soil is provided. There has thus been outlined, rather broadly, the more important features of the invention. In this respect, it is understood that the invention is not limited in its application to the details of arrangements of the components/means set forth in the description and/or drawings. The invention is capable of other embodiments and of being practiced and carried out in various ways. Also, it is to be understood that the phraseology and terminology employed herein are for the purpose of description and should not be regarded as limiting.

While the above description contains many specificities, these should not construed as limitations on the scope of the invention, but as exemplification of the presently-preferred embodiments thereof. Many other ramifications are possible within the teaching to the invention. For instance, the improved device can be fully and successfully used for the agricultural field and can be connected in the needed places to the agricultural pipe system of the soil/turf oxygen enrichment.

The persons of ordinary skills and/or creativity in the art will readily observe that numerous modifications and advantages of the improved device may be made while retaining the teachings of the invention.

As such, those skilled in the art will appreciate that the conception, upon which this disclosure is based, can readily be utilized as a basis for the designing of other structures, for carrying out the several purpose of the present invention. It is important, therefore, that the claims be regarded as including such equivalent constructions insofar as they do not depart from the spirit and scope of the present invention.

THE DRAWING REFERENCE NUMERALS

1.—an improved device for oxygen enrichment of a soil;
2.—a garden pot;
3.—a soil;
4.—a soil surface;
5.—a soil sub-surface;
6.—a rootzone;
7.—a root;
8—a plant;
9—a handle means;
10.—a vertical tubular means;
11.—an aperture;
12.—a first soil loosening means;
13.—a second soil loosening means;
14.—a third soil loosening means;
15.—a tubular connecting means;
16.—a vertical portion (of the tubular connecting means 15);
17.—a horizontal portion (of the tubular connecting means 15);
18.—a first slot;
19.—an upper end of the vertical tubular means 10;
20.—a lower end of the vertical tubular means 10;
21.—an outside surface of the vertical tubular means 10;
22.—a first half portion of the second soil loosening means 13;
23.—a second half portion of the second soil loosening means 13;
24.—a horizontal tubular means;
25.—an inner surface of the horizontal portion 17 (of the tubular connecting means 15);
26.—an outer surface of the horizontal tubular means 24;
27.—a second slot;
28.—an inner surface of the vertical tubular means 10;
29.—an inner surface of the vertical portion 16 (of the tubular connecting means 15);
30.—a connection means;
31.—a bottom wall of connection means 30;
32.—an auxiliary aperture;
33.—a bolt;
34.—a nut;
35.—a bottom wall of the garden pot 2;
36.—an auxiliary tubular means;
37.—a first half portion of the third soil loosening means 14;
38.—a second half portion of the third soil loosening means 14;
39.—a tubular wall of the vertical tubular means 10;
40-40—a first cross-section of the vertical tubular means 10;
41-41—a cross-section of coupling of the lower end 20 of the vertical tubular means 10 with the first variant (not divided) of the third soil loosening means 14;
42-42—a cross-section of coupling of the lower end 20 of the vertical tubular means 10 with the second variant (divided) of the third soil loosening means 14;
43-43—a first cross-section of the horizontal tubular means 24;
44-44—a top cross-sectional view of the improved device 1;
45-45—a second cross-section of the vertical tubular means 10;
46-46—a third cross-section of the vertical tubular means 10;
47-47—a second cross-section of the horizontal tubular means 24;
48-48—a fourth cross-section of the vertical tubular means 10;
49-49—a fifth cross-section of the vertical tubular means 10;
50.—an axis of the vertical tubular means 10;
51.—a washer.

What is claimed is:

1. A device for oxygen enrichment of a soil comprising
a vertical tube including
a plurality of apertures along said vertical tube;
a handle rigidly connected to an upper end of said vertical tube of said device for oxygen enrichment of said soil;
a plurality of soil loosening means installed in a lower end of said vertical tube, wherein said plurality of soil loosening means are vertically spaced and installed perpendicularly to an axis of said vertical tube, wherein the length of each of said plurality of soil loosening means is larger than an outside diameter of said vertical tube, so that at least one end of each of said plurality of soil loosening means extends over an outside surface of said vertical tube;
a tubular connecting means including
a vertical portion, wherein said vertical portion comprises at least one slot, said slot being horizontally oriented, and wherein said lower end of said vertical tube is inserted into said vertical portion of said tubular connecting means to allow clockwise and counterclockwise pivotal movements of said vertical tube within said vertical portion, and wherein said at least one end of the lowermost one of said plurality of soil loosening means is unobstructedly located within and moves along said at least one slot so that the clockwise and counterclockwise movements of said vertical tube are limited by a length of said at least one slot;
a horizontal portion angled 90° to said vertical portion of said tubular connecting means;
a horizontal tube including a plurality of apertures along said horizontal tube, wherein said horizontal tube is rigidly connected to said horizontal portion of said tubular connecting means.

2. The apparatus of claim 1, wherein said handle includes an opening for delivery of chemicals or soil nutrition supplements.

3. The apparatus of claim 1, wherein said tubular connecting means and said horizontal tube are provided as one piece.

4. The apparatus of claim 1, wherein each of said plurality of soil loosening means is rigidly coupled with said vertical tube.

5. A device for oxygen enrichment of a soil comprising
   a vertical tube including
   a plurality of apertures along said vertical tube;
   a handle rigidly connected to an upper end of said vertical tube of said device for oxygen enrichment of said soil;
   a plurality of soil loosening means installed in a lower end of said vertical tube, wherein said plurality of soil loosening means are vertically spaced and installed perpendicularly to an axis of said vertical tube, wherein the length of each of said plurality of soil loosening means is larger than an outside diameter of said vertical tube, so that at least one end of each of said plurality of soil loosening means extends over an outside surface of said vertical tube;
   a connecting means including
   a vertical portion, wherein said vertical portion comprises at least one slot, said slot being horizontally oriented, and wherein said lower end of said vertical tube is inserted into said vertical portion of said tubular connecting means to allow clockwise and counterclockwise pivotal movements of said vertical tube within said vertical portion, and wherein said at least one end of the lowermost one of said plurality of soil loosening means is unobstructedly located within and moves along said at least one slot so that the clockwise and counterclockwise movements of said vertical tube are limited by a length of said at least one slot;
   a bottom wall comprising an auxiliary aperture through said bottom wall of said connecting means and a fastener extending through an aperture in a bottom of a garden pot and said auxiliary aperture to secure said device for oxygen enrichment of said soil to said garden pot.

6. The apparatus of claim 5, wherein each of said soil loosening means is rigidly coupled with said vertical tube.

7. The apparatus of claim 5, wherein said fastener for connecting said bottom wall to said bottom of said garden pot is a screw.

8. The apparatus of claim 5, wherein said fastener for connecting said bottom wall to said bottom of said garden pot is a bolt and a nut.

9. The apparatus of claim 5, wherein said handle includes an opening for delivery of chemicals or soil nutrition supplements.

\* \* \* \* \*